FILM RECORD CARD

Filed Sept. 8, 1964

INVENTOR.
Thomas P. Anderson
Robert Beispel

BY Hill, Sherman, Meroni, Gross & Simpson ATTORNEYS

United States Patent Office 3,228,134
Patented Jan. 11, 1966

3,228,134

FILM RECORD CARD

Thomas P. Anderson, Hubbard Woods, and Robert Beispel, Des Plaines, Ill., assignors to Microseal Corporation, Chicago, Ill., a corporation of Illinois Filed Sept. 8, 1964, Ser. No. 394,804
3 Claims. (Cl. 40—158)

This invention is directed to film record cards and is more particularly directed to a film record card of the type wherein microfilm strips or the like may be mounted within or on a statistical card. This case constitutes a continuation-in-part of our earlier application for patent entitled "Film Record Card," Serial No. 170,744, which was filed on February 2, 1962.

With the ever increasing use of microfilm records and statistical cards in conjunction with one another, it has become desirable to provide a means for mounting a microfilm directly on such a statistical card. Many means have in the past been devised for mounting such microfilm records on statistical cards but such prior developments have not proven entirely satisfactory.

For instance, a good many structures have been devised wherein microfilm strips are simply mounted over apertures formed within cards by means of a suitable adhesive. Other structures have been devised wherein a transparent sheet overlies the aperture within a card and is secured to one surface of the card and thereafter a microfilm strip is mounted across the aperture on the rear face of the card or directly on the transparent sheet by means of adhesives so that the front surface of the film is protected. In each of the foregoing instances however, at least one surface of the film strip is exposed and is thus susceptible to dust damage and the adverse effects of handling. Still further, in each of the foregoing types of structures, the film strip is mounted in place by means of an adhesive so that for all practical purposes the film strips are permanently mounted on their respective statistical cards.

Still other film display cards have been devised wherein film strips are adapted to be fitted within pockets formed on one surface of the statistical cards.

Still further, record cards have been devised having apertures therein which are adapted to receive separate film holder assemblies which themselves serve as a mounting means for a film strip and which are adapted to be inserted within the record card aperture and secured therein by a suitable means. In these structures, however, the film holder assembly must be removed before a film strip may be inserted or removed from the film holder assembly itself.

We have devised a film record card which is believed to obviate each of the above enumerated disadvantageous characteristics of prior types of film record cards but which is very simple in design and which is therefore economical to produce and use while facilitating utilization of the film strip.

In general, the invention finds application in connection with a record card having an aperture formed therein and having transparent enveloping members or sheets disposed on opposite sides of the card and overlying the aperture. The sheets, if rectangular in configuration, have three edges thereof secured to the opposed surfaces of the card by means of a suitable adhesive or the like which is placed on the card along the edges of the aperture but the fourth edges thereof are not sealed to the card although they do overlie the card (that is, that edge of each sheet does not terminate at the edge of the aperture). A microfilm strip may thus be inserted into the pocket formed intermediate the enveloping members, between one surface of the card and that portion of the transparent sheet mounted thereon which is not secured to the card surface. Inasmuch as the unsecured edge of the transparent sheet overlies the adjacent surface of the record card, very little dust will seep into the pocket formed intermediate the enveloping members and the film strip will thus practically be protected from all atmospheric impurities and will, of course, be protected from stains, etc. resulting from handling of the card. Nonetheless, since no adhesive is used on the film strip for maintaining it in its proper position within the record card aperture, the film strip may readily be removed from the card pocket.

Generally speaking, it will be most desirable to provide an aperture in the record card which is only slightly larger than the film strip to be mounted therein so that the end edges of the card defining the aperture will maintain the film strip in a fixed position. Under some circumstances, however, film strips of constant width but of varying lengths may be mounted within the record cards. In order to assure that both short and long film strips which are of equal width can be maintained in a fixed position within the record card aperture regardless of their respective lengths and in order to assure positive positioning of any film strip within the aperture, we have conceived the idea of providing a means on the card for gripping the side edges of the film strip when it is inserted into the film pocket so that it cannot move within the film pocket.

It is therefore an object of our invention to provide an improved film record card having a means for positively mounting a film strip in a fixed position on a card in such a manner that the strip will be protected on each side thereof from atmospheric impurities and from stains, etc. resulting from handling of the card.

Another object of the invention is directed to the provision of means for snugly engaging the side edges of a film strip when the film strip is mounted within a record card aperture to prevent movement of the film strip therein.

Yet another object of the invention resides in the provision of an aperture card having side edge portions of the card defining the aperture extending inwardly to frictionally engage a film strip and thereby hold it within the aperture.

These and other objects of the invention will appear from time to time as the following specification proceeds and with reference to the accompanying drawings, wherein.

Figure 1:
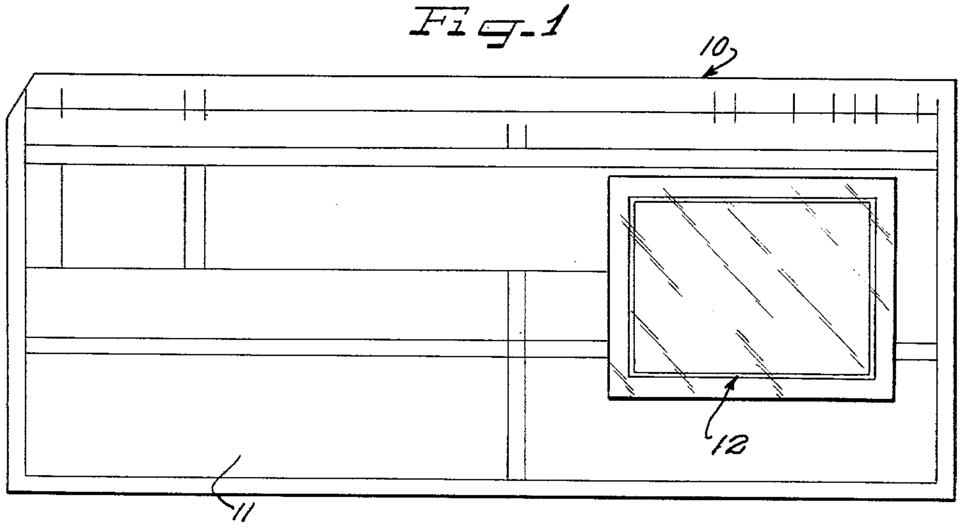
FIGURE 1 is a front elevational view of a film record card of the general type referred to herein.

Referring initially to FIGURE 1, a film record card 10 is illustrated as comprising the usual statistical card 11 having a rectangular aperture 12 formed therein.

Transparent enveloping members or sheets 13 and 14 are rectangular in configuration and are mounted on the front and rear surfaces, respectively, of the card 11 so that they overlie the aperture 12. The rear sheet 14 may be secured to the rear wall of the card 11 around the aperture 12 about the entire periphery thereof by means of a suitable adhesive coating. However, in FIGURE 2 the enveloping members 13 and 14 are illustrated as being mounted over the aperture so that their edges overlie portions of the card defining the aperture but only three edges of each of the enveloping members are secured to the respective surfaces of the card. In each case an unsecured portion of the enveloping member (13*a* and 14*a*, respectively) overlies the card. Since the unsecured edge portions 13*a* and 14*a* are affixed to the record card only at their ends, a slight gap 15 may be formed between the enveloping members and the record card. In fact, this gap would be very small and may not exist at all. This of course would be dependent upon the manner in which the enveloping members were mounted on the record and on whether or not the record card is disposed in a completely flat plane. It is very important to understand that the unsecured edge or edges of one or both of the enveloping members lies parallel to the ends of the card so that when the record card is passed sideways through a film sorting machine the sensing fingers, rollers, and the like will not catch on any part of the enveloping member.

Figure 2:
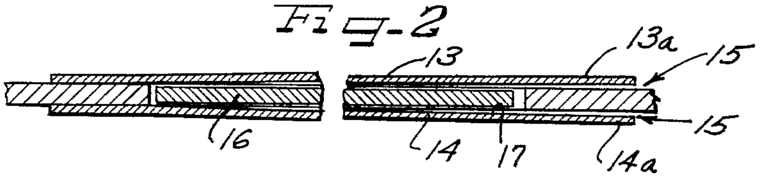
FIGURE 2 is a fragmental vertical sectional view of the card illustrated in FIGURE 1.

Generally speaking, it will be understood that a film strip 16 may be inserted through the gap 15 into the film pocket 17 formed intermediate the enveloping members 13 and 14 and that once disposed within the pocket, as illustrated in FIGURE 2, it will be protected from substantially all atmospheric impurities as well as from stains caused by handling and the like. Since the enveloping members 13 and 14 are transparent, light may be transmitted through the enveloping members as well as the film 16 if it is desired to project the film image on a screen and thus removal of the film for this purpose is not necessitated. Still further, practically all foreign particles will be prevented from entering the pocket 17 since the edge portions of the enveloping members which are not secured to the card 11 substantially overlie the card and are normally maintained in juxtaposition with the respective surfaces of the card due to the fact that they are maintained relatively taut by the other secured edges thereof.

The film strip 16 is thus secured within the card 11 in such a manner that it may be readily viewed at will without necessitating its removal from the card while at the same time, it is protected from damage but is not itself physically altered since no adhesives are applied to the film strip. Furthermore, the film 16 is protected from being accidentally damaged since it is held in coplanar relation with the card 11 by the enveloping members 13 and 14. Viewing of the film strip by light projection through the film pocket is not hampered by an edge of one or more of the enveloping members overlying the surface of the film strip as is true in some prior devices of this type.

Figure 3:
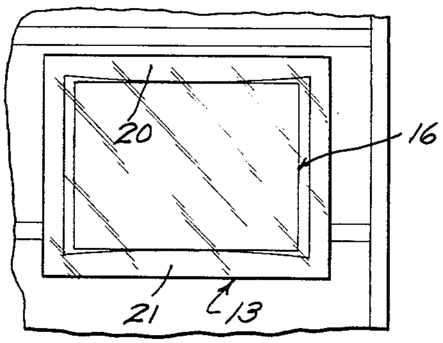
FIGURE 3 is a fragmental front elevational view of a card constructed in accordance with the invention wherein the side edges of the aperture are curved inwardly to engage the film strip.

A particularly important feature of the invention is illustrated in FIGURE 3. It will be understood that microfilm strips are generally of constant width though they may vary to some degree in length. Projection devices have been designed for accepting record cards constructed in the manner disclosed herein so that the image contained on a film strip which is mounted within the film pocket may be enlarged and projected on a screen. For such applications it is desirable that the film strip be mounted at the "optical center" of the film pocket. It will also be observed that it is desirable to prevent the film strip from moving within the film pocket at all times since such movement of the film strip might accidentally cause the film strip to slip out of the film pocket.

To obviate the above noted conditions, we have designed a film record card with inwardly extending arcuate card edges such as 20 and 21 in FIGURE 3 which are spaced apart a distance approximating the width of a film strip. We have found that it is not desirable to maintain this minimum aperture width throughout the entire length of the aperture since such a construction would make film strip insertion extremely difficult. The arrangement shown in FIGURE 3 serves to provide the desired end of preventing movement of the film strip within the film pocket, since the inwardly extending arcuate edges 20 and 21 snugly engage the side edges of the film strip, but the step of film strip insertion is in no way hindered. In addition, this means by which the film is retained in frictional engagement with the side edges of the aperture permits the film to be removed at will as desired.

It is important to emphasize the fact that film record cards of the type illustrated in FIGURE 3 can be rapidly processed through known types of sorting and tabulating machines at rates which have not been heretofore possible. Such processing machines generally employ both rollers and feelers (which are often arranged to contact both sides of the record cards). Since the enveloping members formed on the cards illustrated in the drawings completely overlie both sides of the film strip, no part of the film strip ever comes into contact with these members with the result that contamination of the film srip is thereby prevented. Since the enveloping members entirely overlie the aperture, the edges of the aperture are not exposed to the rollers or feelers. Thus, the thin enveloping member edges will be the only edges exposed to the feelers. Also, the unsecured edges of the enveloping members lie along lines parallel to the direction of movement of the record cards through known types of tabulating machines and this fact further reduces the propensity for the cards to be damaged or cause malfunction of the machine. Lastly, the positive means of frictionally holding film within the pockets permits the cards to be handled and sorted rapidly without danger of losing the mounted film.

It will be understood that a film record constructed in accordance with the principles of this invention will have a wide variety of uses but it should be kept in mind that one of the primary features of the invention relates to record cards which, although capable of varied applications, are well suited to be processed through automatic tabulating machines at a rate which has heretofore not been possible with prior types of film record cards.

It will be understood that this embodiment of the invention has been used for illustrative purposes only and various modifications may of course be made from our invention without departing from the spirit and scope of the novel concepts thereof.

What we claim is:

1. A film record card comprising:

a card having edges defining a generally rectangular aperture;

enveloping members mounted on opposite sides of said card overlying said aperture to define with the edges of said aperture a film pocket for receiving a strip of film;

wherein a central section of at least one of said edges of said card is bowed toward the center of said aperture and, with the opposed edges of said aperture, abuts and lies in the same plane as the film to maintain the film in a fixed position within the pocket.

2. A film record card comprising:

a card having edges defining generally a rectangular aperture;

enveloping members mounted on opposite sides of said card overlying said aperture to define with the edges of said aperture a film pocket for receiving a strip of film;

wherein at least two opposed edges of said card are curved, intermediate their ends, toward the center of said aperture and abut and lie in the same plane as the film to maintain the film in a fixed position within the pocket.

3. A film record card comprising:

a card having side and end edges defining a generally rectangular aperture;

enveloping members mounted on opposite sides of said card and overlying said aperture to define with said aperture a film pocket for receiving a strip of film and providing, adjacent one of said end edges, an access opening to permit insertion and removal of a strip of film;

whereby said enveloping members are adapted to hold the strip of film coplanar with the card; and wherein a constriction is formed centrally of the aperture and between the side edges thereof of sufficient amount to cause said side edges of said card to abut the edges of a film inserted within the said pocket.

References Cited by the Examiner

UNITED STATES PATENTS

| | | | |
|---|---|---|---|
| 1,397,096 | 11/1921 | Hammer. | |
| 2,532,776 | 12/1950 | Linser | 40—152 |
| 2,572,735 | 10/1951 | Kugel | 40—17 X |
| 2,843,955 | 7/1958 | Engelstein | 40—158 |
| 2,861,368 | 11/1958 | Rosenberg | 40—158 |
| 3,019,579 | 2/1962 | Heckman | 40—158 |

FOREIGN PATENTS

| | | |
|---|---|---|
| 382,105 | 10/1932 | Great Britain. |

EUGENE R. CAPOZIO, *Primary Examiner.*

JEROME SCHNALL, *Examiner.*